US012091820B2

(12) United States Patent
Acosta et al.

(10) Patent No.: US 12,091,820 B2
(45) Date of Patent: Sep. 17, 2024

(54) EMBOSSED TISSUE

(71) Applicant: Kimberly-Clark Worldwide, Inc., Neenah, WI (US)

(72) Inventors: Ludovic Acosta, Reigate (GB); Massimo Cagnone, Prato Sesia (IT)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 18/030,410

(22) PCT Filed: Oct. 9, 2020

(86) PCT No.: PCT/US2020/054919
§ 371 (c)(1),
(2) Date: Apr. 5, 2023

(87) PCT Pub. No.: WO2022/075993
PCT Pub. Date: Apr. 14, 2022

(65) Prior Publication Data
US 2023/0374733 A1 Nov. 23, 2023

(51) Int. Cl.
*D21H 27/40* (2006.01)
*B31F 1/07* (2006.01)
(Continued)

(52) U.S. Cl.
CPC ............... *D21H 27/40* (2013.01); *B31F 1/07* (2013.01); *B31F 5/04* (2013.01); *D21H 27/005* (2013.01);
(Continued)

(58) Field of Classification Search
CPC ...... D21H 27/40; D21H 27/02; D21H 27/005; D21H 27/002; B31F 1/07; B31F 5/04;
(Continued)

(56) References Cited

U.S. PATENT DOCUMENTS 6,733,866 B2 * 5/2004 Muller .................... B32B 29/08 428/154
7,871,692 B2 1/2011 Morin et al.
(Continued)

FOREIGN PATENT DOCUMENTS

CN 110547715 A 12/2019
DE 3345886 A1 6/1984
(Continued)

OTHER PUBLICATIONS

Keyence, "Sdr (Developed Interfacial Area Ratio) Area Roughness Parameters", May 18, 2020, https://www.keyence.com/ss/products/microscope/roughness/surface/sdr-developed-interfacial-area-ratio.jsp.

*Primary Examiner* — Jose A Fortuna
(74) *Attorney, Agent, or Firm* — KIMBERLY-CLARK WORLDWIDE, INC.

(57) ABSTRACT

The embossed multi-ply tissue products have improved bulk, softness, strength, embossment clarity and/or embossment height. The multi-ply tissue products comprise a first tissue ply having a plurality of embossments arranged in an open first pattern such as open, continuous line elements, which may be substantially oriented in the cross-machine direction (CD). The second ply of the multi-ply tissue product have a plurality of micro-embossments disposed in a second pattern. The first and second embossing patterns are such that when the first and second plies are joined to form the product the first and second patterns are not in registration with one another.

14 Claims, 9 Drawing Sheets

(51) Int. Cl.
*B31F 5/04* (2006.01)
*D21H 27/00* (2006.01)
*D21H 27/02* (2006.01)

(52) U.S. Cl.
CPC ...... *D21H 27/02* (2013.01); *B31F 2201/0735* (2013.01)

(58) Field of Classification Search
CPC ...... B31F 2201/0735; B31F 2201/0733; B31F 2201/0766; B31F 2201/0761; A47K 10/16
See application file for complete search history.

(56) References Cited

U.S. PATENT DOCUMENTS

| | | | | |
|---|---|---|---|---|
| 8,287,986 | B2 * | 10/2012 | Huss | D21H 27/30 428/156 |
| 11,280,051 | B2 * | 3/2022 | Satake Neto | D21H 27/002 |
| 2003/0026953 | A1 * | 2/2003 | Muller | B32B 29/08 428/174 |
| 2005/0103456 | A1 | 5/2005 | Hein et al. | |
| 2009/0226670 | A1 | 9/2009 | Schütz | |
| 2012/0156447 | A1 | 6/2012 | Hein et al. | |
| 2012/0244320 | A1 * | 9/2012 | Sauter | D21H 27/002 264/293 |
| 2012/0255671 | A1 | 10/2012 | Wallstabe et al. | |
| 2018/0135254 | A1 | 5/2018 | Bhat | |
| 2018/0142422 | A1 | 5/2018 | Baum et al. | |
| 2020/0129012 | A1 | 4/2020 | Yoshida et al. | |
| 2022/0275584 | A1 * | 9/2022 | Satake Neto | B31F 1/07 |
| 2022/0287924 | A1 * | 9/2022 | Monson | B31F 1/07 |
| 2023/0011745 | A1 * | 1/2023 | Kientz | B32B 7/12 |
| 2023/0374733 | A1 * | 11/2023 | Acosta | D21H 27/02 |
| 2024/0044085 | A1 * | 2/2024 | Cagnone | D21H 27/40 |

FOREIGN PATENT DOCUMENTS

| | | | | |
|---|---|---|---|---|
| DE | 29808740 | U1 | 8/1998 | |
| DE | 202005019141 | U1 | 2/2006 | |
| DE | 202007007402 | U1 | 8/2007 | |
| EP | 0184261 | B1 | 4/1991 | |
| EP | 0765215 | B1 | 3/1999 | |
| EP | 0801698 | B1 | 10/1999 | |
| EP | 0797705 | B1 | 12/1999 | |
| EP | 0980750 | A1 | 2/2000 | |
| EP | 0806521 | A3 | 4/2000 | |
| EP | 1073797 | B1 | 6/2004 | |
| EP | 0935021 | B1 | 1/2006 | |
| EP | 1270196 | B1 | 3/2006 | |
| EP | 1322462 | B1 | 6/2006 | |
| EP | 0764228 | B2 | 3/2007 | |
| EP | 1239079 | B1 | 6/2007 | |
| EP | 1504886 | A3 | 8/2007 | |
| EP | 1395706 | B1 * | 11/2007 | A47K 10/16 |
| EP | 1391174 | B1 | 7/2008 | |
| EP | 1731296 | B1 | 9/2008 | |
| EP | 1878830 | B1 | 9/2009 | |
| EP | 1455014 | B1 | 8/2011 | |
| EP | 1319748 | B9 | 11/2011 | |
| EP | 1979540 | B1 | 11/2011 | |
| EP | 1472411 | B1 | 3/2012 | |
| EP | 1525977 | B1 | 6/2012 | |
| EP | 1632604 | B1 | 10/2013 | |
| EP | 2132382 | B1 | 1/2014 | |
| EP | 2018959 | A3 | 7/2014 | |
| EP | 1907199 | B1 | 9/2014 | |
| EP | 2480406 | B1 | 9/2014 | |
| EP | 2247788 | B1 | 12/2014 | |
| EP | 2692948 | B1 | 1/2016 | |
| EP | 2686164 | B1 | 4/2016 | |
| EP | 2170596 | B1 | 8/2016 | |
| EP | 2228212 | B1 | 11/2016 | |
| EP | 2057016 | B1 | 4/2017 | |
| EP | 2252455 | B1 | 5/2017 | |
| EP | 2699413 | B1 | 7/2018 | |
| EP | 1911574 | B2 | 3/2019 | |
| EP | 3489006 | A1 | 5/2019 | |
| EP | 3143203 | B1 | 2/2023 | |
| EP | 3856509 | B1 * | 11/2023 | A47K 10/16 |
| EP | 4269690 | A2 * | 11/2023 | A47K 10/16 |
| EP | 3907328 | B1 * | 12/2023 | A47K 10/16 |
| GB | 2376436 | A * | 12/2002 | A47K 10/16 |
| KR | 20230084208 | A * | 6/2023 | A47K 10/16 |
| WO | 1999055967 | A1 | 11/1999 | |
| WO | 2004050375 | A1 | 6/2004 | |
| WO | 2005080677 | A2 | 9/2005 | |
| WO | 2005085527 | A1 | 9/2005 | |
| WO | 2005113226 | A1 | 12/2005 | |
| WO | 2007103433 | A2 | 9/2007 | |
| WO | 2007130540 | A3 | 3/2008 | |
| WO | 2008142264 | A2 | 11/2008 | |
| WO | 2009031118 | A1 | 3/2009 | |
| WO | 2009151544 | A2 | 12/2009 | |
| WO | 2010009769 | A1 | 1/2010 | |
| WO | 2010086837 | A3 | 11/2010 | |
| WO | 2011071040 | A1 | 6/2011 | |
| WO | 2013082240 | A1 | 6/2013 | |
| WO | 2013126531 | A1 | 8/2013 | |
| WO | 2013184909 | A1 | 12/2013 | |
| WO | 2014077751 | A1 | 5/2014 | |
| WO | 2014078357 | A1 | 5/2014 | |
| WO | 2015095431 | A1 | 6/2015 | |
| WO | 2015095435 | A1 | 6/2015 | |
| WO | 2015175615 | A1 | 11/2015 | |
| WO | 2015176063 | A1 | 11/2015 | |
| WO | 2016090242 | A1 | 6/2016 | |
| WO | 2017129240 | A1 | 8/2017 | |
| WO | 2017187285 | A1 | 11/2017 | |
| WO | 2017196519 | A1 | 11/2017 | |
| WO | 2018166572 | A1 | 9/2018 | |
| WO | 2018229676 | A1 | 12/2018 | |
| WO | 2019004225 | A1 | 1/2019 | |
| WO | 2019059180 | A1 | 3/2019 | |
| WO | 2019203699 | A1 | 10/2019 | |
| WO | 2020068839 | A1 | 4/2020 | |
| WO | 2020180314 | A1 | 9/2020 | |
| WO | WO-2022075993 | A1 * | 4/2022 | B31F 1/07 |

* cited by examiner

EMBOSSED TISSUE

BACKGROUND

It is well known in the art to emboss bond multiple plies of lightweight cellulosic material to form tissue products such as bath tissues, facial tissues, paper towels, industrial wipers, foodservice wipers, napkins, medical pads, and other similar products. The embossed tissue products may comprise one, two, three or more plies. Embossing not only plies multiple webs together but may also impart the tissue product with an aesthetically pleasing pattern. Examples of apparatus and methods for embossing multi-ply paper products are disclosed, for example, in U.S. Pat. Nos. 6,733,866, 7,871,692 and 8,287,986 and U.S. Publication No. 2012/0156447.

Embossing may also be used to alter or improve certain tissue product properties such as sheet bulk and perceived softness. For example, tissue products manufactured using conventional creped wet press technology can be embossed subsequent to creping to improve bulk and perceived softness. Embossing often increases the surface area of the sheets by introducing a plurality of protuberances and thereby enhances the bulk and handfeel of the product. Examples of apparatus and methods for embossing multi-ply paper products to improve handfeel and bulk are disclosed, for example, in U.S. Publication Nos. 2005/0103456, 2018/0142422 and 2018/0135254.

Often tissue products marketed in rolls, contain a specified number of sheets per roll. Tissue embossed in conventional patterns of dot embossments, when packaged in roll form, exhibit a tendency to be non-uniform in appearance often due to compressing of the embossments as the sheet is wound onto the roll, detracting from the appearance of the rolls.

SUMMARY

The present inventors have now discovered novel embossed multi-ply tissue products having improved bulk, softness, strength, embossment clarity and/or embossment height compared to prior art embossed tissue products. In certain embodiments the multi-ply tissue products of the present invention may comprise a first tissue ply having a plurality of embossments arranged in an open first pattern, which in certain preferred embodiments may at least partially comprise open, continuous line elements, which may be substantially oriented in the cross-machine (CD) of the product. The products may further comprise a second ply having a plurality of micro-embossments, and more preferably a plurality of micro-dot embossments, disposed in a second pattern. Preferably the micro-embossment pattern is such that when the first and second plies are joined to form the product the first and second patterns are not in registration with one another.

In a particularly preferred embodiment, the present invention provides an embossed multi-ply product comprising a first embossed ply having a plurality of embossments disposed thereon, the embossments may be in the form of individual dot embossments arranged to form a continuous line element. The continuous line element may have a wave-like shape and be substantially oriented in the cross-machine (CD) of the product. The dot embossments may have a depth (measured as described in the Test Methods section below) of about 300 μm or more, such as from about 300 to about 500 μm. The combination of these elements provides an aesthetically pleasing and well-defined embossment, while improving important tissue product properties such as sheet and roll bulk and softness, particularly when combined with a second ply comprising micro-embossments.

In other embodiments the present invention provides a multi-ply tissue product comprising a top ply having a first surface having a plurality of discrete, spaced apart, dot embossments disposed thereon and a bottom ply having a first surface having a plurality of discrete micro-embossments disposed thereon, wherein the dot embossments are arranged to form a first open pattern and the micro-embossments are arranged to form a second pattern having an embossment density of least about 50 embossments per square centimeter of ply surface area. When the first and second plies are brought into facing relation with one another to form the product it is preferred that the first and second patterns of micro-embossments are not registered with one another.

In still other embodiments the present invention provides a multi-ply tissue product, such as a product comprising two, three or four plies, wherein the basis weight of each of the plies is less than about 30 grams per square meter (gsm), such as from about 10 to about 30 gsm and more preferably from about 15 to about 25 gsm, and the upper most ply comprises a plurality of dot embossments having a depth greater than 300 μm and arranged to form an open first pattern and a bottom most ply comprising a plurality of micro-embossments disposed in a second pattern. When the first and second plies are brought into facing relation with one another to form the product it is preferred that the first and second patterns of micro-embossments are not registered with one another.

In other embodiments the present invention provides a multi-ply tissue product comprising a first ply having a plurality of dot embossments arranged to form a plurality of continuous, substantially CD-oriented, wave-like line elements and a second ply comprising a plurality of micro-embossments having a density of at least about 50 embossments per square centimeter and covering at least about 6 percent of the surface of the second ply. Preferably the micro-embossments are arranged in a pattern that does not register with the wave-like pattern of embossments disposed on the first ply.

In yet other embodiments the invention provides a method of producing a tissue product comprising the steps of: a) providing a first embossing station with a first embossing roll having a first embossing pattern comprising a plurality of protuberances disposed in a first open embossing pattern consisting of a plurality of substantially CD-oriented wave-like line elements and a first counter roll, the first embossing roll and first counter roll defining a first nip there between; b) providing a second embossing station with a second embossing roll comprising a plurality of protuberances having a height from about 0.8 to about 1.2 mm and disposed in a second embossing pattern having a density of at least about 50 protuberances/cm$^2$ and a second counter roll, the second embossing roll and second counter roll defining a second nip there between; c) directing a first tissue ply into the first nip to emboss the first tissue ply with the first open embossing pattern; d) directing a second tissue ply into the second nip to emboss the second tissue ply with the second embossing pattern; and e) joining the first and second tissue plies together to form a multi-ply tissue product, wherein the first and second embossing patterns are not in registration with one another.

DEFINITIONS

Figure 2:
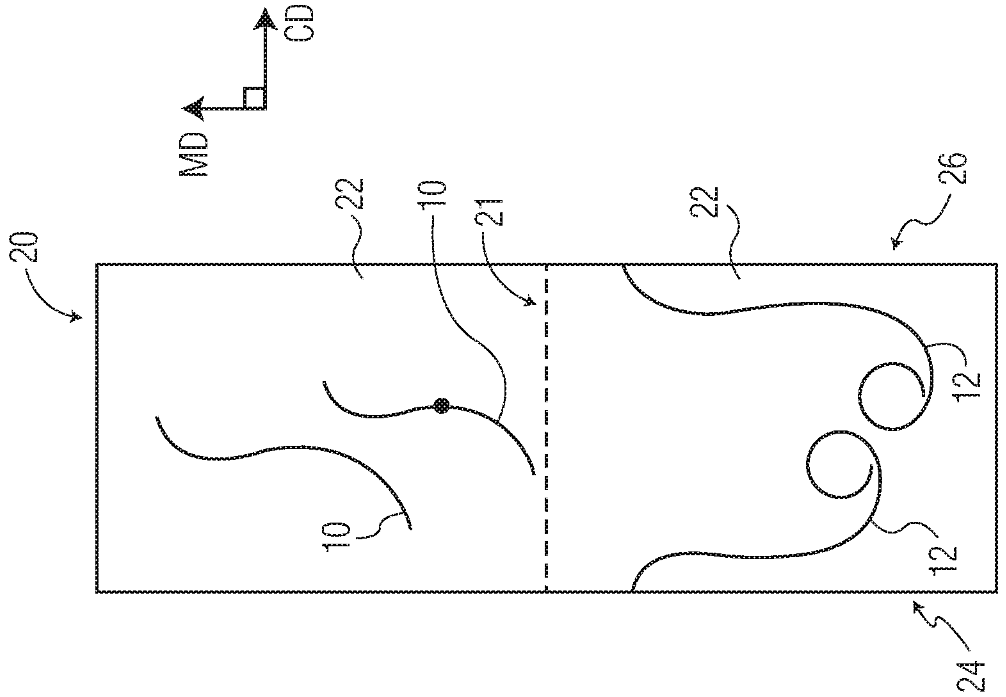
FIG. 2 illustrates a tissue product comprising two sheets having open design elements disposed thereon.

As used herein the term "machine direction" or "MD" generally refers to the direction in which a tissue web or product is produced. The term "cross-machine direction" or "CD" refers to the direction perpendicular to the machine direction.

As used herein the term "basesheet" refers to a tissue web formed by any one of the papermaking processes described herein that has not been subjected to further processing, such as embossing, calendering, treatment with a binder or softening composition, perforating, plying, folding, or rolling into individual rolled products.

As used herein the term "tissue product" refers to products made from basesheets and includes, bath tissues, facial tissues, paper towels, industrial wipers, foodservice wipers, napkins, medical pads, and other similar products.

As used herein the term "ply" refers to a discrete tissue web used to form a tissue product. Individual plies may be arranged in juxtaposition to each other. In a preferred embodiment, tissue products prepared according to the present invention comprise two or more plies arranged in facing relation to one another.

As used herein, the term "layer" refers to a plurality of strata of fibers, chemical treatments, or the like, within a ply. A "layered tissue web" generally refers to a tissue web formed from two or more layers of aqueous papermaking furnish. In certain instances, the aqueous papermaking furnish forming two or more of the layers comprises different fiber types.

As used herein the term "basis weight" generally refers to the conditioned weight per unit area of a tissue and is generally expressed as grams per square meter (gsm). Basis weight is measured as described in the Test Methods section below. While the basis weights of tissue products prepared according to the present invention may vary, in certain embodiments the products have a total basis weight of about 30 gsm or greater, such as about 34 gsm or greater, such as about 36 gsm or greater, such as from about 30 to about 65 gsm, such as from about 32 to about 60 gsm, such as from about 38 to about 48 gsm.

As used herein, the term "caliper" refers to the thickness of a tissue product, web, sheet or ply, typically having units of microns (μm) and is measured as described in the Test Methods section below.

As used herein, the term "sheet bulk" refers to the quotient of the caliper (μm) divided by the basis weight (gsm) and having units of cubic centimeters per gram (cc/g). Tissue products prepared according to the present invention may, in certain embodiments, have a sheet bulk of about 6.0 cc/g or greater, such as about 8.0 cc/g or greater, such as about 10.0 cc/g or greater, such as from about 6.0 to about 14.0 cc/g.

As used herein, the term "geometric mean tensile" (GMT) refers to the square root of the product of the machine direction tensile strength and the cross-machine direction tensile strength of the web. The GMT of tissue products prepared according to the present invention may vary, however, in certain instances the GMT may be about 800 g/3" or greater, such as about 900 g/3" or greater, such as about 1,000 g/3" or greater, such as from about 800 to about 1,700 g/3".

As used herein "substantially oriented" when used in reference to an embossed element, a motif or a pattern generally means that the element has a principle orientation that is within at least 10 degrees of the MD or CD axes and more preferably within at least 5 degrees of the MD or CD axes.

As used herein the term "line element" refers to an element in the shape of a line, which may be continuous, discrete, interrupted, or a partial line with respect to a tissue product on which it is present. The line element may be of any suitable shape such as straight, curled, curvilinear, and mixtures thereof. In one example, the line element may comprise a plurality of discrete elements, such as dots, dashes or broken lines for example, that are disposed relative to one another to form an element in the shape of a line having a substantially connected visual appearance.

Figure 3:
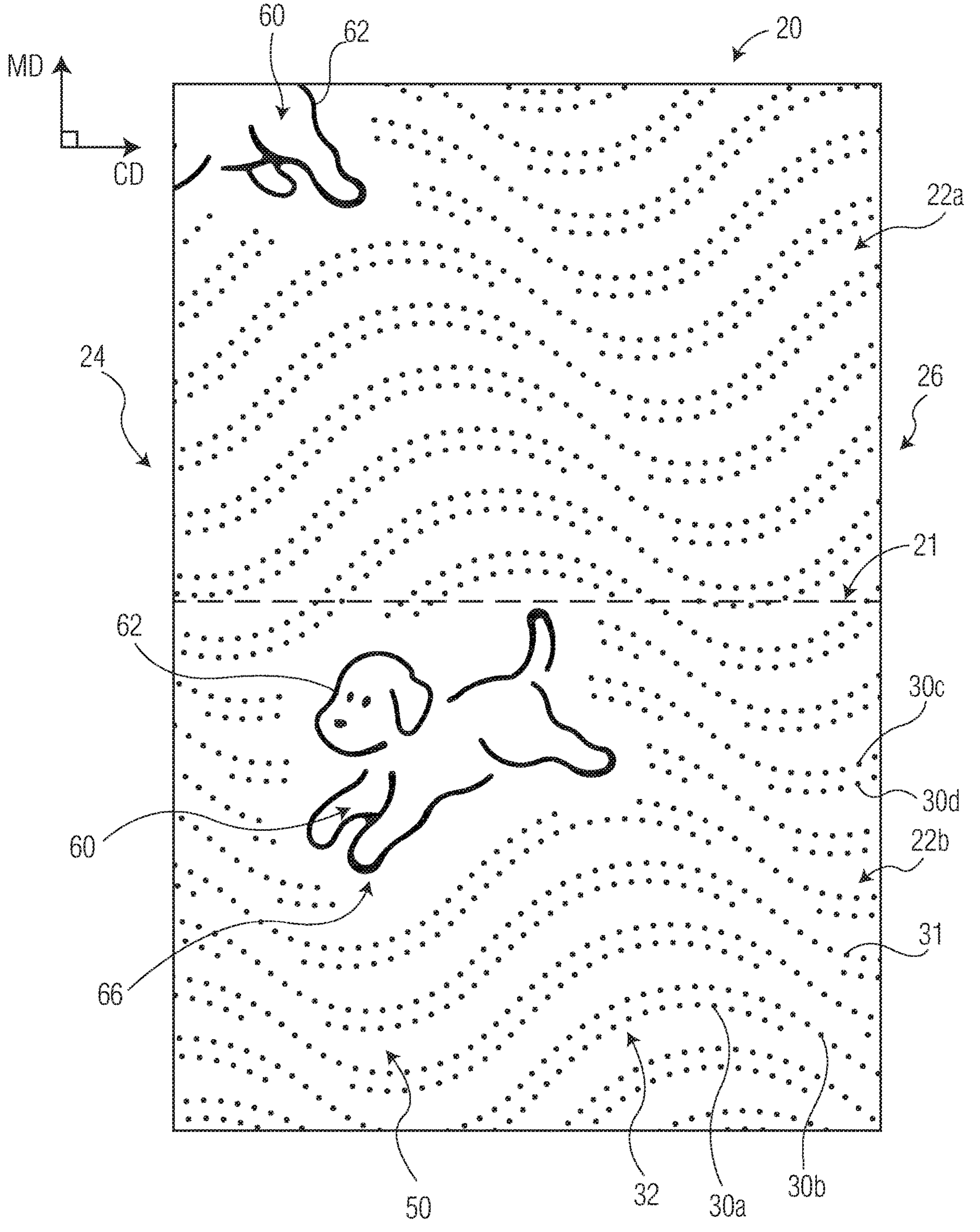
FIG. 3 is top plan view of an embossed tissue product.

As used herein the term "continuous," when referring to an element disposed on the surface of a tissue product, such as a design element, a motif or a pattern, means that the element extends throughout one dimension of the tissue product surface. A non-limiting example of a continuous pattern 50 is illustrated in FIG. 3 where a first pattern 50 comprises a plurality of line elements 30 having a wave-like shape that extends from a first edge 24 to a second edge 26 of the product 20. The first pattern 30 is continuous despite the presence motifs 60 of the second pattern 66 periodically interrupting certain line elements, such as line elements 30*c* and 30*d*, that form a portion of the first pattern 50.

As used herein the term "discrete," when referring to an element disposed on the surface of a tissue product, such as a line element, a design element or a pattern, means that the element is visually unconnected from other elements and does not extend continuously in any dimension of the tissue product surface. A non-limiting example of a discrete motif 60 is illustrated in FIG. 3 where curvilinear line elements 62 are arranged to form a character representation that does not extend continuously in any dimension of the tissue product surface 22. Further, the discrete motif 60 is visually unconnected from line elements 30 forming a second motif 32.

As used herein the term "design element" generally refers to a shape or combination of shapes that visually create a distinct component. A design element is a curvilinear design element where it is at least partially formed by a curvilinear line element. A design element may be continuous or discrete. It is not necessary that a design element form a recognizable shape. The design element may be textured having a z-directional elevation relative to the plane of the tissue product, such as protrusions or depressions formed either by wet molding or embossing the tissue product. In other embodiments the design element may not be textured and be formed by printing on the tissue product surface.

Figure 1:
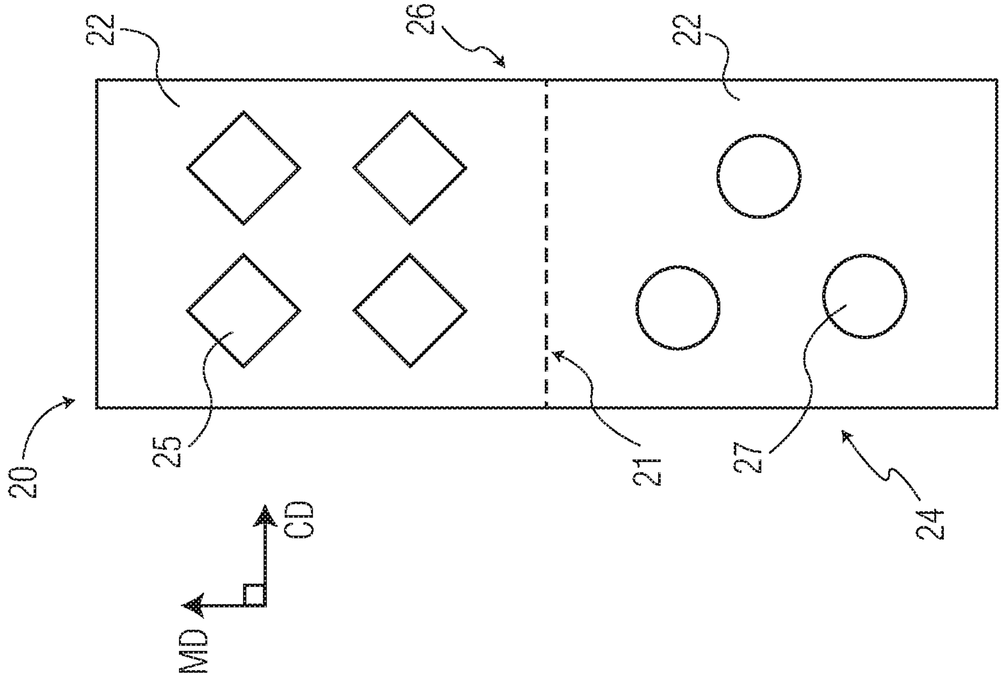
FIG. 1 illustrates a tissue product comprising two sheets having closed design elements disposed thereon.

As used herein the term “closed,” when referring to a design element, generally means that the design element has no beginning or end. In certain instances, an element may be closed despite having breaks or gaps provided that the overall visual appearance is that the element has no beginning and no end. Examples of various closed design elements 25, 27 are illustrated in FIG. 1. In each instance the closed design elements 25, 27 have no beginning or end within the given sheet 22.

As used herein the term “open,” when referring to a design element, generally means that design element has a beginning and/or an end. A design element may be open even though it begins or ends at the edge of a given sheet. In certain instances, a design may be open even though it begins at one edge of a sheet and continues across the sheet to another edge. Examples of various open design elements 10, 12 are illustrated in FIG. 2. Other examples of open design elements are illustrated in FIG. 3, which illustrates a first continuous pattern 50 comprising a repeating motif 32 consisting of a pair of open, continuous, line elements 30*a*, 30*b* that begin at a first edge 24 and end at a second edge 26.

As used herein the term “pattern” generally refers to the arrangement of one or more design elements. Within a given pattern the design elements may be the same or may be different, further the design elements may be the same relative size or may be different sizes. For example, with reference to FIG. 3, a tissue product may comprise a first pattern 50 and second pattern 66, where the first pattern comprises an open design element 30 and the second pattern 66 comprises a closed design element 62.

As used herein the term “motif” generally refers to the recurrence of one or more design elements within a pattern. The recurrence of the design element may not necessarily occur within a given sheet, for example, in certain embodiments the design element may be a continuous design element extending across two adjacent sheets separated from one another by a line of perforations. Motifs are generally non-random repeating units that form a pattern.

As used herein the term “micro-embossments” generally refers to a plurality of discrete embossments disposed on a tissue ply where the number of embossments per square centimeter of tissue surface area (embossment density) is at least 25 embossments/cm$^2$, such as at least about 30 embossments/cm$^2$, such as at least about 40 embossments/cm$^2$, such as from 25 to about 80 embossments/cm$^2$. In certain embodiments the micro-embossments may consist of small protuberances on a given tissue ply and be formed by small protrusions on an embossing roll which press against and into the tissue ply to be embossed. The micro-embossments may be arranged in a pattern and may cover at least about 6 percent of the ply surface area, such as from about 6 to about 15 percent of the ply surface area.

As used herein the term “dot embossment” means an embossment that exhibits an aspect ratio of about 1:1.25 or less, such as an aspect ratio from about 1.0 to about 1.25. Non-limiting examples of dot embossments are embossments having a circular, oval, square, or triangular cross-sectional shape.

Figure 5A:
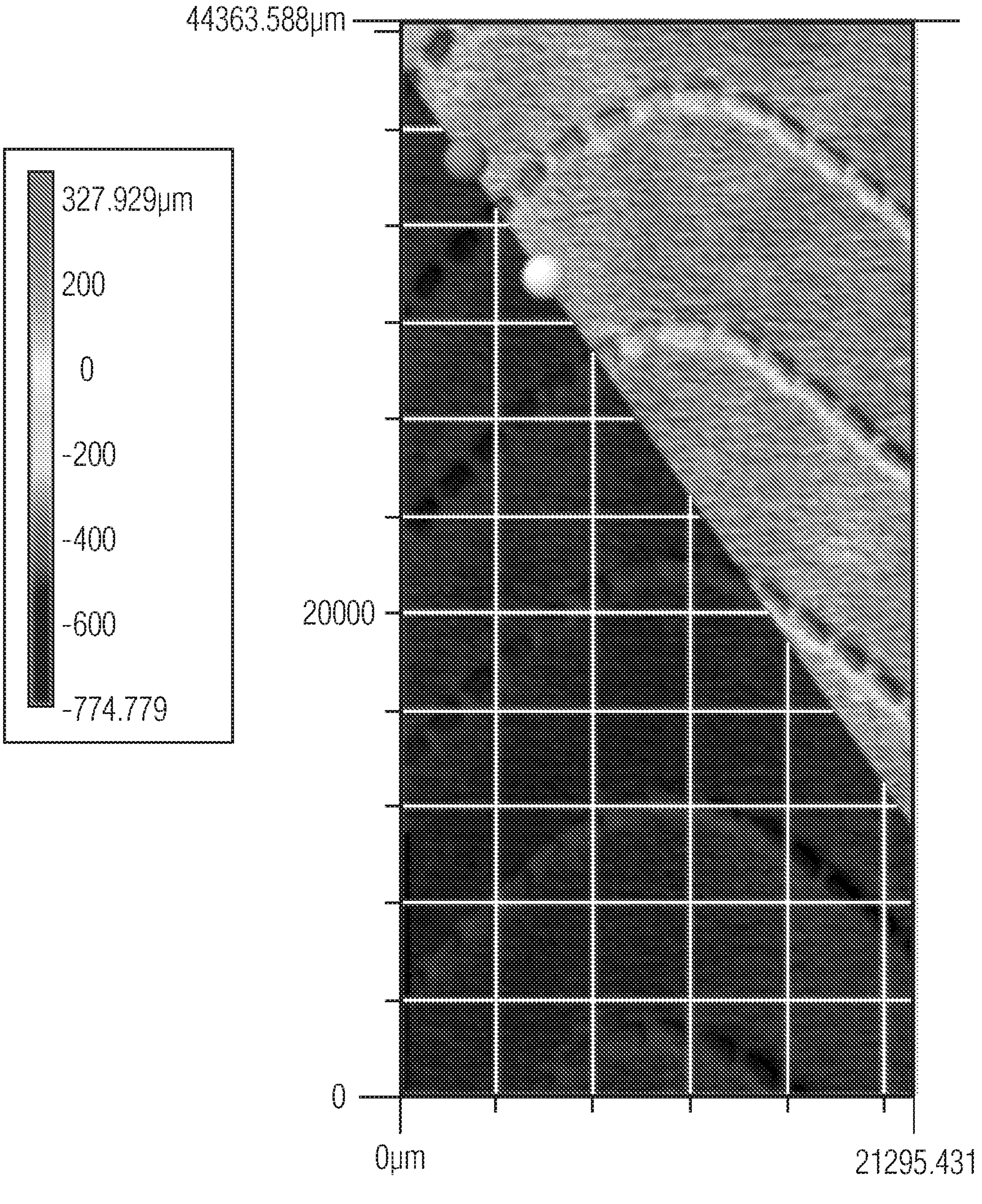
FIG. 5A is a 3-D surface profile of a tissue product according to one embodiment of the present invention, the image was taken using a VHX-1000 Digital Microscope manufactured by Keyence Corporation (Osaka, Japan) at a magnification of ×100.
Figure 5B:
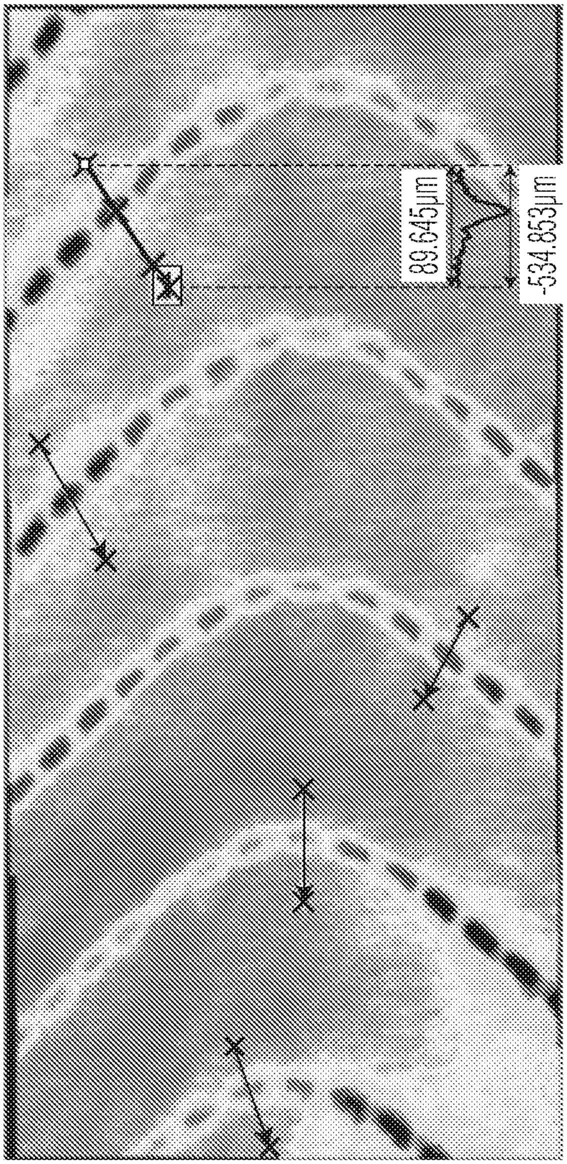
FIG. 5B is a 2-D image of the product of FIG. 5A and a plot of the surface topography using a VHX-1000 Digital Microscope manufactured by Keyence Corporation (Osaka, Japan) at a magnification of ×100.
Figure 5C:
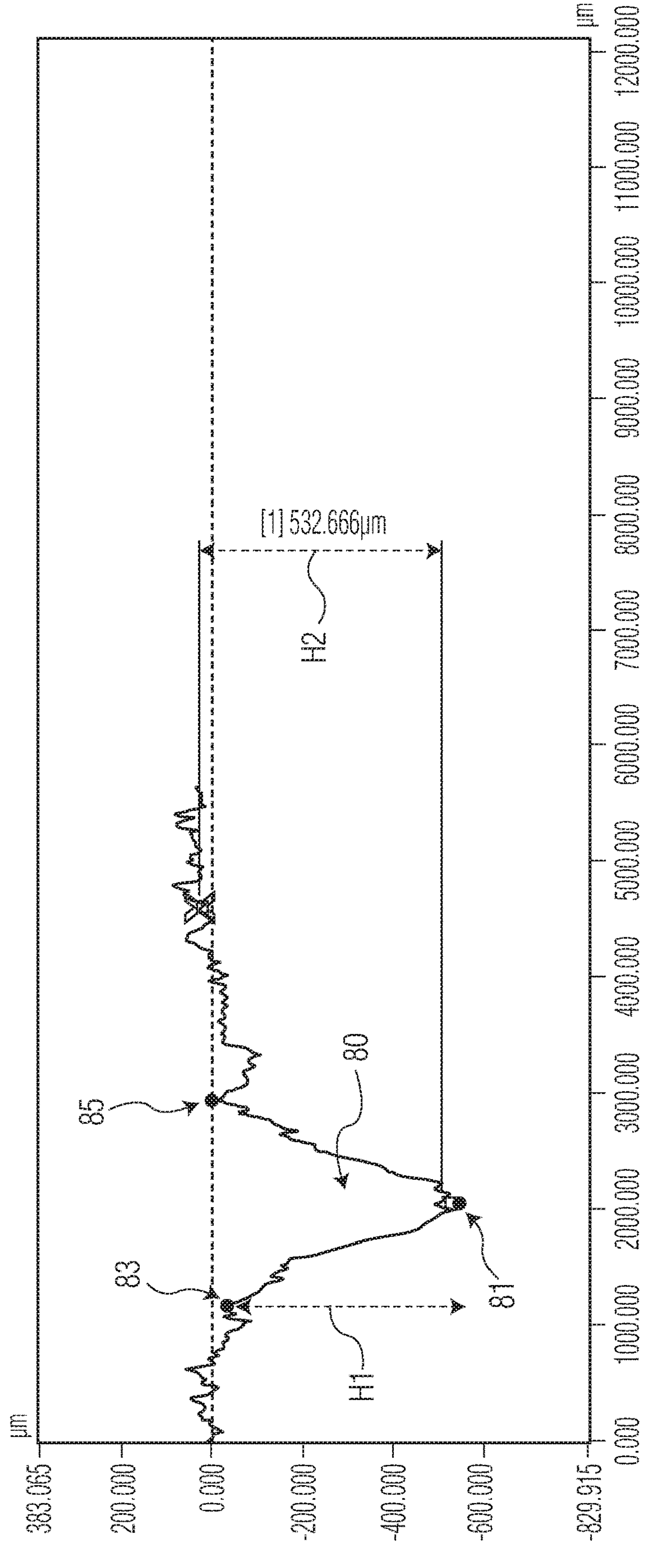
FIG. 5C is a cross-sectional height profile of the product of FIG. 5B.
Figure 6:
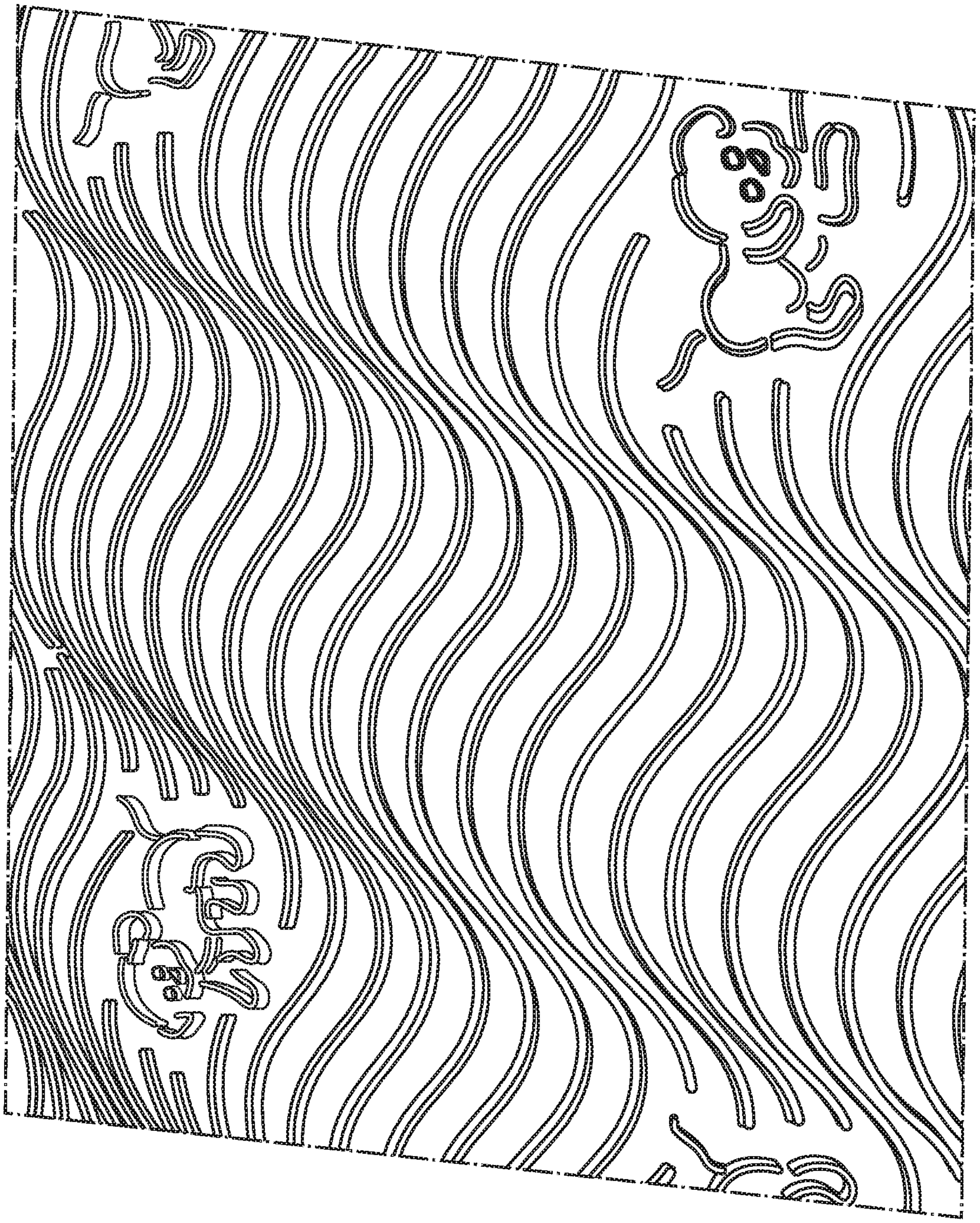
FIG. 6 is a top plan view of an embossing roll useful in the present invention.

As used herein the term “depth” generally refers to the distance between the upper most surface plane of a tissue ply and the bottom most surface plane of an embossment. For example, as illustrated in FIG. 5C, the depth of a given embossment 80 may be the average of the z-directional distance between the embossment minimum 81 and the left-most embossment maximum 83 (H1) and the z-directional distance between the embossment minimum 81 and the right-most embossment maximum 85 (H2). Depth typically has units of microns (μm) and is measured as described in the Test Methods section below.

DETAILED DESCRIPTION

The present invention provides tissue products and more particularly embossed tissue products comprising two or more embossed tissue plies. Preferably one of the plies comprises an open embossing pattern comprising one or more open design elements. In particularly preferred embodiments the open pattern may comprise open curvilinear line elements, particularly line elements having a wave-like shape that is substantially oriented in the cross-machine direction (CD) and extends from one edge of the product to another. The present inventors have discovered that open design elements, and more particularly open curvilinear design elements, are well suited for use in the present invention because they contain inflection points that connote femininity, softness and cleansing. Additionally, the use of open design elements, and open curvilinear design elements in particular, provide for gradual transitions in contour within a pattern that may be soothing to a consumer and more easily balanced with other design elements. Further, the use of curvilinear design elements enables the formation of open design elements that provide the resulting patterns with a sense of continuity and balance that is visually appealing.

The present inventors have further discovered that the open design elements may be disposed on a first tissue ply that may be plied together with a second ply comprising micro-embossments to create a tissue product having improved properties, such as sheet bulk. Surprisingly, the micro-embossments on the second ply do not have to be disposed in registration with the open design elements on the first ply to achieve the improved properties. That is the embossing pattern disposed on the first, uppermost ply, does not have to match or be phased relative to, the embossing pattern disposed on the second, bottommost ply.

Accordingly, in certain preferred embodiments, the invention provides a tissue product comprising a first, uppermost, ply having an open embossing pattern disposed thereon and a second, bottommost, ply comprising a plurality of micro-embossments, wherein the micro-embossments are not registered with the open embossing pattern of the uppermost ply. In a particularly preferred embodiment, the micro-embossments are disposed on the bottommost ply at a density of 25 embossments/cm$^2$ or more, such as at least about 30 embossments/cm$^2$, such as at least about 40 embossments/cm$^2$, such as from 25 to about 80 embossments/cm$^2$. Regardless of the density, the micro-embossments are disposed on the bottommost ply in a pattern that does not register with the embossing pattern disposed on the uppermost ply.

A wide breadth of design elements may be selected from when developing open patterns useful in the present invention. Particularly preferred design elements are those having a curvilinear shape and more particularly curvilinear line elements, such as line elements having a wave-like shape, such as a sinusoidal wave. Although open patterns useful in the present invention are preferably formed from curvilinear design elements, one skilled in the art will appreciate that a pattern may include shapes that are not curvilinear.

In certain instances, it may be preferable that one of the embossed plies comprise a pattern that is both open and continuous, particularly open and continuous patterns formed at least partially from curvilinear design elements. Accordingly, in a particularly preferred embodiment the present invention provides an embossed tissue product comprising a first ply comprising a plurality of embossments disposed in a first pattern comprising open and curvilinear design elements. In a particularly preferred embodiment, the first pattern may comprise a continuous wave-like line element that is substantially oriented in the CD.

Several non-limiting curvilinear design elements useful in the present invention are illustrated in the attached figures. For example, FIG. 2 illustrates a first curvilinear element 10 and a second curvilinear element 12. The first element 10 is formed from pair of open, discrete S-shaped curvilinear line element. The second element 12 is formed from a pair of open, curled curvilinear line elements. FIG. 3 illustrates another pattern 50 formed from a repeating motif 32 consisting of open, continuous, pairs of wave-like elements 30*a*, 30*b*. The line elements 30*a*, 30*b* are substantially aligned in the cross-machine direction (CD) and spaced apart from one another in the machine direction (MD).

Figure 4:
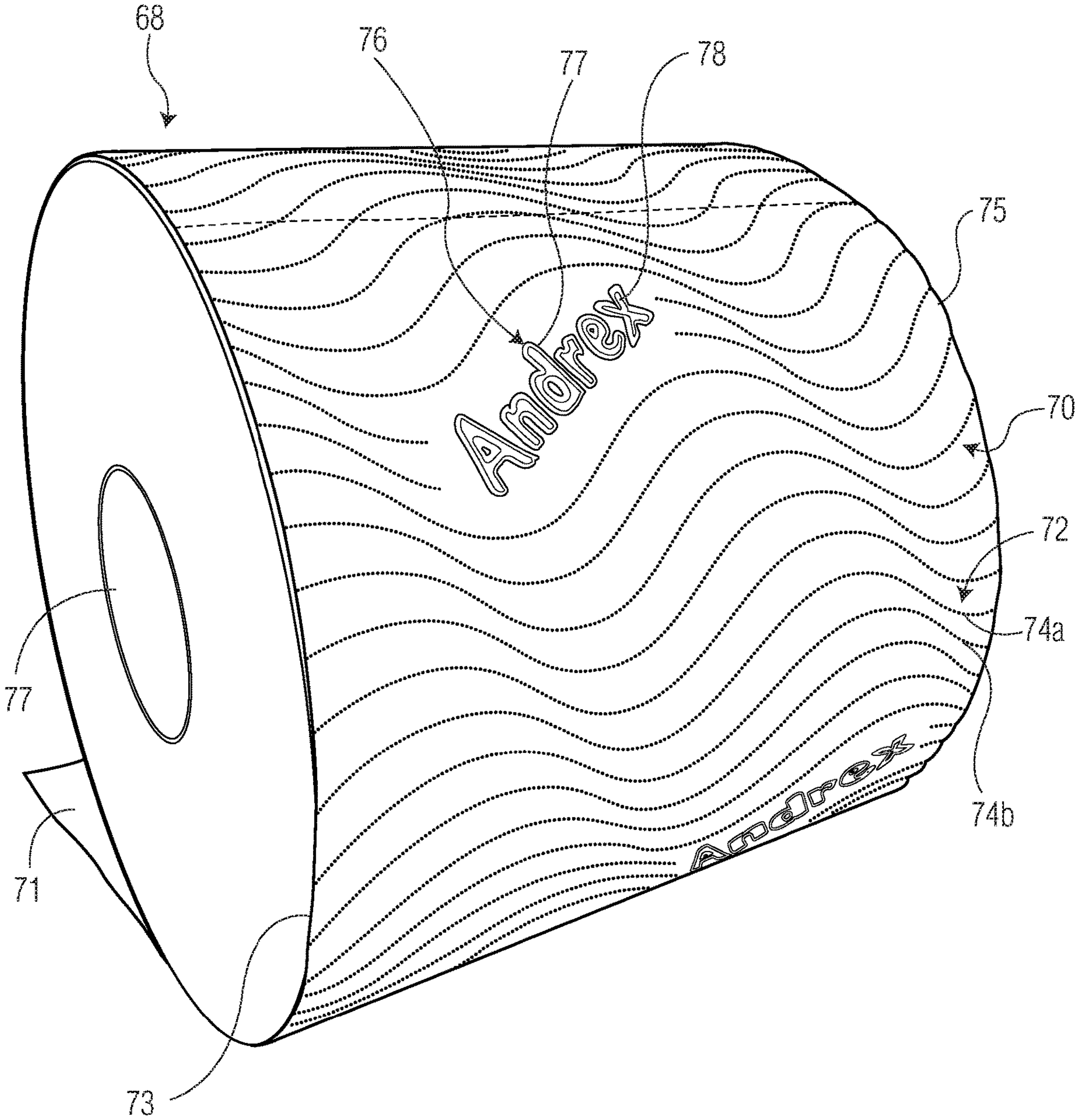
FIG. 4 is perspective view of a rolled tissue product.

Still another pattern comprising repeating motifs of open, continuous, pairs of wave-like elements is illustrated in FIG. 4. The rolled tissue product 68 comprises a tissue sheet 71 spirally wound around a core 77 and having first and second edges 73, 75. The uppermost ply 70 comprises first and second embossing patterns 72, 76. The first embossing pattern 72 is open and consists of repeating, open, continuous wave-like line elements 74*a*, 74*b*. The spacing of adjacent line elements 74*a*, 74*b* in the MD varies providing the pattern 70 with a three-dimensional effect.

In those embodiments where the spacing between adjacent line elements varies along the length of the line element the line elements may be spaced apart from one another a maximum distance of at least about 3.0 mm, more preferably at least about 3.5 mm, and still more preferably at least about 4.0 mm, such as from about 3.0 to about 6.0 mm. The spacing of adjacent line elements is measured along the machine direction axis between the embossments forming the line element. The line elements may converge towards one another so as to be spaced apart from one another a minimum distance of less than about 1.0 mm, more preferably less than about 0.80 mm, and still more preferably at least about 0.40 mm, such as from about 0.20 to about 1.0 mm. While the line elements coverage towards one another, it is generally preferred that the line elements do not merge with one another so as to maintain the appearance of the lines being spaced apart from one another. In this manner adjacent line elements may converge and diverge from one another to provide the product with a three-dimensional appearance.

Additionally, while in certain embodiments it may be preferred that a pattern comprise an open curvilinear design element, the pattern may also include closed design elements such as circles and the like. While non-curvilinear design elements and closed design elements may be incorporated into the inventive tissue products, it is generally desirable that they only be incorporated to the extent that they complement the curvilinear design elements and reinforce connotations of femininity, softness and cleansing.

While closed design elements may be included in a pattern, or embossed in a second pattern, in certain embodiments it may be preferred that the uppermost ply have an embossing pattern consisting only of open elements, particularly, open, continuous curvilinear design elements.

Provided that consumers prefer patterns comprising curvilinear design elements it may be preferable to form patterned tissue products without the use of rectilinear elements. Rectilinear elements may be perceived as being sharp, dangerous and rough and as such may be avoided when forming patterns for use in tissue products according to the present invention. Thus, in certain embodiments, the first embossed ply comprises an embossing pattern that does not contain rectilinear elements. For example, the embossing pattern may consist essentially of curvilinear and linear design elements.

With reference again to FIG. 3, tissue products 20 of the present invention generally comprise opposed lateral edges 24, 26 and horizontal lines of perforations 21 separating the product into individual sheets 22*a*, 22*b*. The tissue product has two principle axes of orientation—the machine direction (MD) and the cross-machine direction (CD). The upper surface of the topmost ply is illustrated and comprises a first pattern 50, also referred to as a background pattern, formed from a repeating motif 32 consisting of open, continuous, pairs of wave-like elements 30*a*, 30*b*. The line elements 30 have a first principle orientation, which is substantially oriented in the CD.

While the orientation of the first pattern relative to the CD is non-limiting, in certain embodiments it may be preferred that the first pattern be skewed slightly relative to the CD, particularly where the first pattern is imparted by embossing. For example, it is known in the art that if embossing patterns were aligned horizontally, the concentration of elements in one location could cause the embossing roll to wear in that area. Likewise, embossing rolls are often used in conjunction with backing surfaces or the like to create a nip. If patterns are aligned horizontally, there may be fluctuations in the concentration of embossing elements at the nip causing vibrations. To resolve these issues, manufacturers often skew their embossing patterns on the embossing roll. Thus, in certain embodiments the first pattern may have a first principle orientation, which is at a skew angle (y) relative to the CD axis of less than about 10 degrees, such as from about 0.5 to about 10 degrees and more preferably from about 1.0 to about 9.0 degrees.

Further, while in certain embodiments it may be preferable that the product comprise an embossing pattern with an open, continuous element, the invention is not so limited. In other embodiments the product may comprise discrete, open elements and in some instances may even comprise closed elements. For example, in FIG. 3 the product comprises a second pattern 66 comprising a line element 62 shaped to form a closed motif 60 in the form of a character representation. Further, while continuous elements are preferred, the continuous element may be formed from discrete elements such as dots or dashes, that, from a visual perspective, appear to be a continuous unbroken line. Thus, despite the breaks, a person is able to mentally complete the shape so as to perceive a broken line element as a continuous line element. A closed pattern 76 is also illustrated in FIG. 4 and comprises line elements forming closed letter-shaped motifs 78.

In certain embodiments the embossments disposed on an upper most ply are shaped and sized to provide the tissue product with improved pattern clarity and definition. As such, the embossments may be relatively deep having a depth, measured as described herein, of about 300 μm or more, such as about 325 μm or more, such as about 350 μm or more, such as from about 300 μm to about 500 μm.

The embossments, which may be in the form of discrete dot embossments, may be arranged to form a line element.

For example, with reference to FIG. 3, the product 20 may comprise a plurality of dot embossments 31 arranged to provide the visual impression of continuous line elements 30 which may be substantially oriented in the cross-machine direction (CD) and extend substantially continuously from a first edge of the product 24 to a second edge 26. The combination of these elements provides an aesthetically pleasing and well-defined embossment, while improving important tissue product properties such as sheet bulk and softness.

The embossing elements disposed on a first ply, such as an upper ply, may be arranged and sized to provide the ply with an embossed pattern having a total embossed surface area ranging from about 2 to about 20 percent, more preferably ranging from about 3 to about 15 percent, even more preferably ranging from about 3 to about 10 percent and still more preferably from about 3 to about 8 percent. Without desiring to be bound by theory, providing a tissue product having an embossed area less than about 20 percent and still more preferably less than about 10 percent and an embossed pattern comprising open, curvilinear elements, particularly a curvilinear line element formed from a plurality of dot emboss elements communicates to the consumer that the product is soft and cushiony. Additionally, at the foregoing embossed areas and shapes the embossed pattern has an aesthetic quality that does not appear overly complicated but simplistic and natural.

The multi-ply products further comprise a bottommost embossed ply having an embossing pattern that is less decorative than the pattern disposed on the uppermost ply but which, when combined with the embossing patterns of the topmost ply, improves certain tissue product properties such as sheet bulk and softness. The bottommost ply bears a pattern that covers at least about 5 percent of the ply surface area, such as between about 5 and between about 50 percent of the ply surface area. The density of the emboss elements on the bottommost sheet can be varied within the foregoing coverage ranges but are generally 25 embossments/$cm^2$ or greater, such as at least about 30 embossments/$cm^2$, such as at least about 40 embossments/$cm^2$, such as from 25 to about 80 embossments/$cm^2$. The shape of the embossments in the bottommost pattern may vary but in certain preferred embodiments are dot embossments having an aspect ratio of about 1.0.

Figure 7:
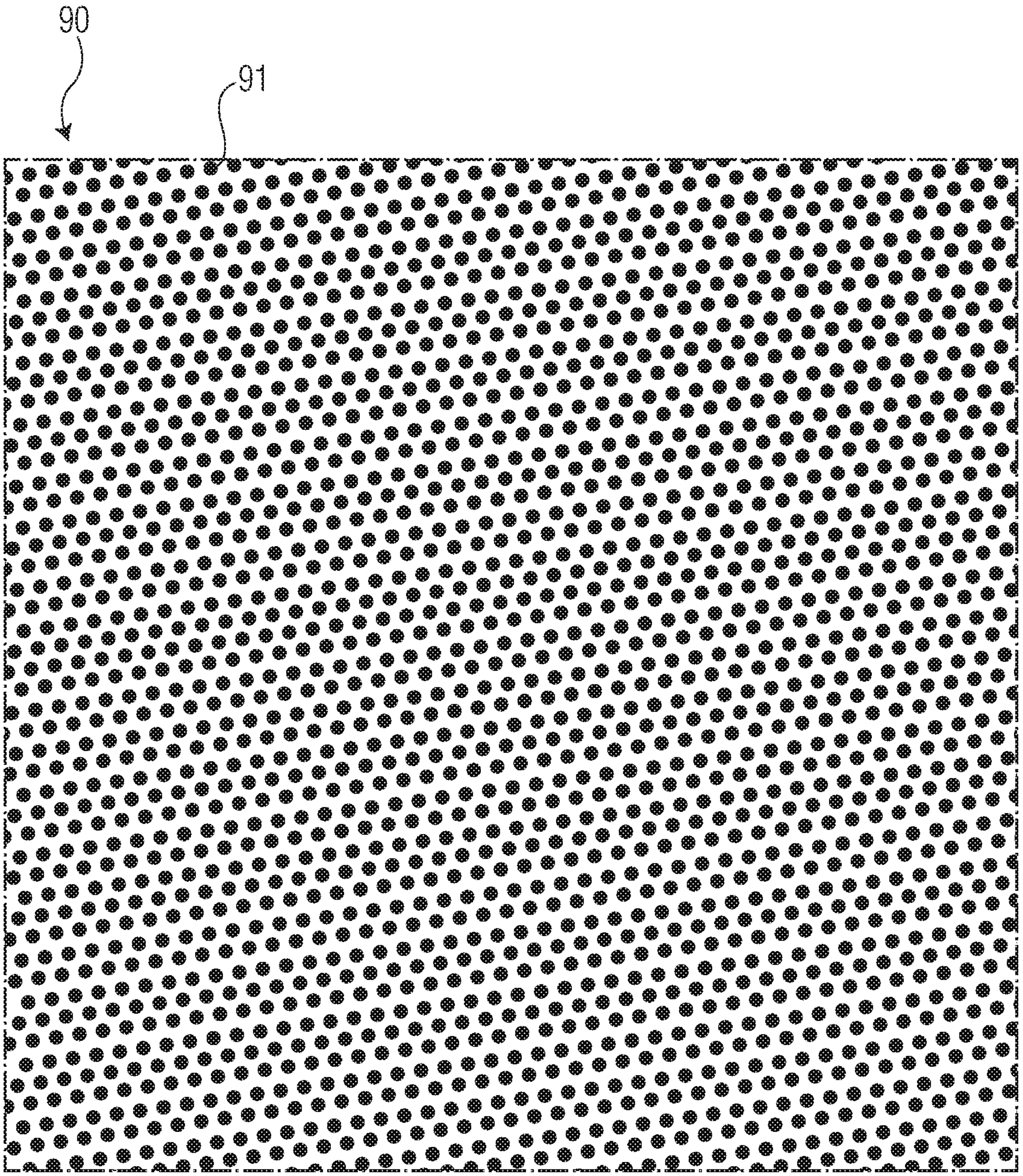
FIG. 7 is a top plan view of an embossing roll useful in the present invention.

FIG. 7 depicts one embossing pattern 90 for use in the products of the present disclosure, particularly an embossing pattern disposed on the bottommost ply of a product. Generally, the pattern 90 will be disposed on the entirety of the bottommost ply, extending from a first edge to a second edge of the ply. The pattern 90 contains a continuous and regular pattern of dot embossments 91, which are preferably micro-embossments. Examples of suitable dot embossment shapes include circles, ovoid and squares having an aspect ratio of from 1 to about 1.25, such as from about 1 to about 1.1. These embossments may be homogeneous in size and shape or can vary within a given pattern. The pattern 90 as shown in FIG. 7, contains embossments 91 of a single size.

Regardless of the particularly embossing pattern disposed on the bottommost ply, it is generally preferred that pattern not be registered with the embossing pattern disposed on the uppermost ply. For example, the uppermost ply may comprise an open embossing pattern comprising a plurality of curvilinear line elements and the bottommost ply may comprise a second embossing pattern comprising a plurality of discrete dot embossments uniformly spaced apart from one another so as to provide an embossment density of 25 embossments/$cm^2$ or greater, more preferably about 40 embossments/$cm^2$ or greater. Because the patterns are not in registration with one another, when the plies are brought together in facing arrangement the embossments of the second pattern do not nest within the embossments of the first pattern, or vice versa.

According to one embodiment, the micro-embossments may be formed using an embossing roll having elements, commonly referred to as protrusions, have a height from about 0.5 to about 1.5 mm, such as from about 0.8 to about 1.2 mm. As used herein, "height" refers to the measurement of the shortest dimension of the micro-embossment element. The angle of the sidewalls of the micro-embossment elements may range from about 0 to about 25 degrees, such as from about 0 to about 15 degrees.

In certain embodiments the pattern of micro-embossments can be oriented so that the tops of the micro-embossments protrude from the tissue ply and form the upper most surface plane of the ply or they can be oriented inward so that they face the interior of the product and may contact another ply and be bonded thereto with an adhesive.

The tissue products of the present invention generally comprise two, three or four tissue plies made by well-known wet-laid papermaking processes such as, for example, creped wet pressed, modified wet pressed, creped through-air dried (CTAD) or uncreped through-air dried (UCTAD). For example, creped tissue webs may be formed using either a wet pressed or a modified wet pressed process such as those disclosed in U.S. Pat. Nos. 3,953,638, 5,324,575 and 6,080,279, the disclosures of which are incorporated herein in a manner consistent with the instant application. In these processes the embryonic tissue web is transferred to a Yankee dryer, which completes the drying process, and then creped from the Yankee surface using a doctor blade or other suitable device.

In other instances, the tissue plies may be manufactured by a through-air dried process known in the art. In such processes the embryonic web is noncompressively dried. For example, textured tissue plies may be formed by either creped or uncreped through-air dried processes. Particularly preferred are uncreped through-air dried webs, such as those described in U.S. Pat. No. 5,779,860, the contents of which are incorporated herein in a manner consistent with the present disclosure.

In still other instances the tissue plies may be manufactured by a process including the step of using pressure, vacuum, or air flow through the wet web (or a combination of these) to conform the wet web into a shaped fabric and subsequently drying the shaped sheet using a Yankee dryer, or series of steam heated dryers, or some other means, including but not limited to tissue made using the ATMOS process developed by Voith or the NTT process developed by Metso; or fabric creped tissue, made using a process including the step of transferring the wet web from a carrying surface (belt, fabric, felt, or roll) moving at one speed to a fabric moving at a slower speed (at least 5 percent slower) and subsequently drying the sheet. Those skilled in the art will recognize that these processes are not mutually exclusive, e.g., an uncreped TAD process may include a fabric crepe step in the process.

The instant multi-ply tissue product may be constructed from two or more plies that are manufactured using the same or different tissue making techniques. In a particularly preferred embodiment, the multi-ply tissue product comprises two or three plies wherein at least one of the plies is a through-air dried ply.

The multi-ply embossed tissue products of the present invention generally have a total product basis weight of at least about 20 gsm, such as at least about 30 gsm, such as at least about 40 gsm, such as from about 20 to about 70 gsm, such as from about 30 to about 65 gsm, such as about 40 to about 60 gsm. In certain instances, the multi-ply embossed tissue products may comprise two, three or four tissue plies where the basis weight of each individual tissue plie is less than about 25 gsm, such as from about 10 to about 20 gsm, such as from about 10 to about 15 gsm.

The multi-ply embossed tissue products of the present invention generally have a geometric mean tensile (GMT) of about 800 g/3" or greater, such as about 900 g/3" or greater, such as about 1,000 g/3" or greater, such as from about 800 to about 1,700 g/3", such as from about 1,000 to about 1,500 g/3". In certain instances, the multi-ply embossed tissue products may comprise two, three, or four tissue plies where the GMT of each individual tissue plie is less than about 600 g/3", such as from about 200 to about 425 g/3", such as from about 350 to about 550 g/3".

In other instances, the multi-ply embossed tissue products of the present invention may have a sheet bulk greater than about 6.0 cc/g, such as from about 6.0 to about 14.0 cc/g. In certain instances, at the foregoing sheet bulks, the tissue products may have a sheet caliper greater than about 300 μm, such as greater than about 400 μm, such as greater than about 500 μm, such as greater than about 600 μm, such as from about 300 to about 1,000 μm.

The foregoing multi-ply tissue products may be converted into rolled tissue products, such as rolled bath tissue products, comprising a multi-ply embossed tissue web spirally wound about a core. Such rolled tissue products may comprise a plurality of connected, but perforated, multi-ply tissue sheets that may be separated from adjacent sheets.

Regardless of the tissue making process used to produce the individual plies, the resulting multi-ply tissue product has an uppermost ply having a plurality of first embossments disposed in a pattern, particularly a pattern comprising open, curvilinear design elements. For example, as shown in FIG. 4, the tissue product 68 may be in the form of a rolled tissue product comprising an embossed multi-ply tissue sheet 71 spirally wound around a core 77. The tissue sheet 71 has a first surface having a plurality of first dot embossments disposed thereon. The plurality of dot embossments are similarly shaped and sized, and disposed to form open, continuous, curvilinear line elements 74 that extend from a first edge 73 to a second edge of a sheet 75.

Generally, the embossed tissue products are an improvement over prior art embossed tissue products, particularly in terms of embossment pattern clarity and definition. Without being bound by any particular theory, it is believed that the improvement in pattern clarity and definition is attributable, in part, to the uppermost ply having an open embossing pattern formed at least in part from embossments that are relatively deep. For example, at least a portion of the embossments forming the open embossing pattern have a depth of about 300 μm or more, such as about 325 μm or more, such as about 350 μm or more, such as from about 300 μm to about 500 μm.

To produce multi-ply tissue products, multiple base tissue sheets are prepared and then combined using well known processing machines (converting machines) which include operations such as unwinding the base tissue sheets, calendering, printing, embossing, bonding of individual plies to be combined together as well as cutting, perforation and folding. It is particularly preferred that one or more base sheets are embossed during formation of the product. An embossing process is carried out in the nip between an embossing roll, also referred to herein as a patterned roll, and an anvil roll, also referred to herein as a counter roll. The embossing roll can have protrusions on its circumferential surface leading to embossments in the paper web.

In certain embodiments the tissue products of the present invention may be manufactured from two or more base sheet webs, such as two, three or four base sheet webs that are combined together and embossed using an embossing technique commonly referred to as DERL (Double Embossing Random Lamination). In the DERL process, a first web is directed through the nip between an embossing roll and an anvil roll. In this nip the web is provided with an embossing pattern. Thereafter, an application roll for adhesive applies adhesive to those parts of the first web at which there are protruding embossing elements in the embossing roll. The adhesive is transported from an adhesive bath via an adhesive transfer roll to the application roll. A second web is transported to the first web and adhesively bonded to the first web in the nip between the so-called marrying roll and the embossing roll. The adhesive bonding takes place at those portions at which the adhesive was applied.

The process further comprises an additional pair of rolls consisting of a second embossing roll and a second anvil roll. The additional pair of rolls serves to emboss the second web before it is adhesively bonded to the first web using the marrying roll. Typically, the additional pair of rolls is placed close to the first pair of rolls and the marrying roll.

The arrangement of the additional pair of rolls is placed close to the first pair of rolls and the marrying roll is not critical here, as the present invention generally does not require that the embossing elements of the first embossing roll and the embossing elements of the second embossing roll be arranged such that the embossed elements of the first embossed ply and the embossed elements of the second embossed ply fit into each other similar to a gearing system. In this manner, the embossing patterns disposed on the upper and bottom plies do not necessarily correlate or register with one another.

Figure 8:
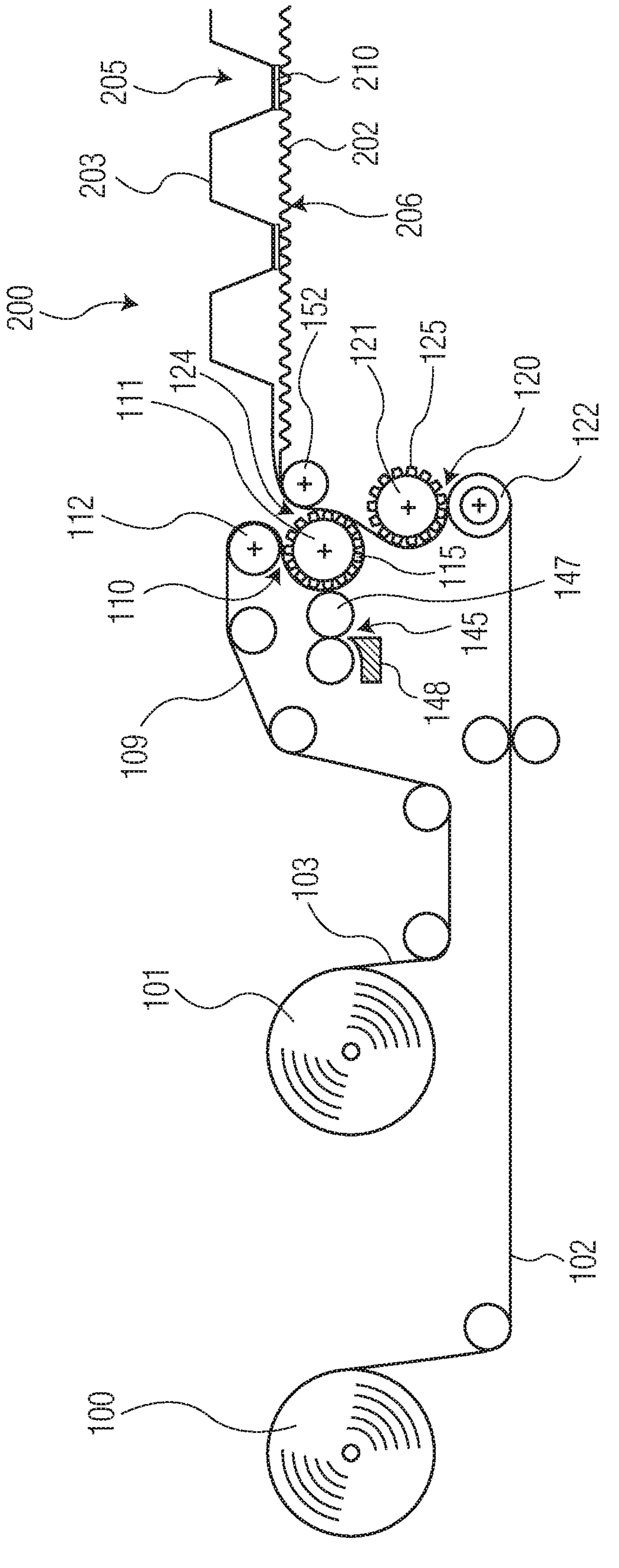
FIG. 8 is a schematic of a process useful in the manufacture of an embossed tissue product according to the present invention.

Turning now to FIG. 8, illustrated is one process for forming a two-ply tissue product 200 comprising an embossed bottommost ply 202 and an embossed uppermost ply 203 according to the present invention. Generally, the process begins by unwinding first and second parent rolls 100, 101 comprising first and second tissue webs 102, 103 which will ultimately form the first and second tissue plies 202, 203. In certain instances, one or more of the webs may be optionally pre-embossed in a first pre-embossing station or be subjected to other converting steps, such as calendering or slitting prior to being embossed and plied into a multi-ply product.

The embossing operation of the present invention utilizes an embossing roll and an anvil that create a nip pressure, when engaged with one another to form an embossing nip, sufficient to create deformations (embossments) in a fibrous structure present within the embossing nip. The embossing roll generally comprises a plurality of protrusions on its outer surface where the protrusions form an embossing pattern. For example, as illustrated in FIG. 8, a first tissue web 103 is directed into the first nip 110 of a first embossing station that includes a first embossing roll 111 and an anvil roll 112. In the nip between the first embossing roll 111 and anvil roll 112 the first ply 103 receives a first embossing pattern by being brought into contact with first protuberances 115 disposed on the surface of the first embossing roll 111.

In particular embodiments, the embossing roll is made of metal, especially steel, hard plastics materials or hard rubber. In case of plastics, very hard plastic material can be preferred, alternatively a resin material is also possible. In particular embodiments, the anvil roll is made of rubber like EPDM or NBR (acrylonitrile-butadiene rubber), paper or steel. The rubber can have a hardness between 20 and 85 Shore A, preferably between 50 and 75 Shore A.

The embossing roll may be made by any suitable process known in the art. Non-limiting examples of suitable processes include laser engraving hard plastic (ebonite) or ceramic or other material suitable for laser ablation to remove material and create embossing elements, chemical engraving of steel or other materials to remove material and create embossing elements, machining aluminum or steel or other metals to remove material and create embossing elements, metallizing processes to build up embossing elements, sintering processes to build up embossing elements and/or other means known in the art to remove material or build up material and achieve a surface topography with the desired pattern and clearances between mating embossing elements.

A second tissue web 102 is unwound from a second parent roll 100 and introduced into the nip 120 formed between a second embossing roll 121 and a second anvil roll 122 which form a second embossing station. As regards the possible materials for the second embossing roll 121 and a second anvil roll 122, the same materials as described above with reference to the first embossing roll 111 and the first anvil roll 112 also apply. Upon passing through the embossing nip 120 the second tissue web 102 is provided with a second embossing pattern, which is preferably different than the pattern applied by the first embossing station. The embossing pattern is imparted to the second tissue web 102 by contacting it with a plurality of second protuberances 125 disposed on the second embossing roll 121.

The process may further comprise an application device 145, which may include an applicator roll 147 for applying functional substances 148 to the first tissue web 103 after it exits the first embossing nip 110. Such applicator devices are well known in the art and are commonly used for the application of adhesives or colored substances. For example, the process may comprise an applicator roll 147 which contacts the protrusions on the first tissue web 103 while supported by the first embossing roll 111.

In a particularly preferred embodiment, an adhesive is applied by the application device, which may comprise an adhesive applicator roll running against the first embossing roll. For laminating the single webs of material together, different types of adhesive can be used. Suitable adhesives are, inter alia, glue on the basis of starch or modified starch like, for example, methyl cellulose or carboxylated methyl cellulose, and adhesively acting polymers on the basis of synthetic resins, caoutchouc, polypropylene, polyisobutylene, polyurethane, polyacrylates, polyvinyl acetate or polyvinyl alcohol. Such adhesives can also contain coloring agents in order to improve the optical appearance of the finished products. Frequently, water-based glues are used for laminating together paper layers.

In certain embodiments, the embossing patterns applied to the first and second tissue webs respectfully do not need to be registered with one another to provide the finished tissue product with improved properties, such as improved sheet bulk. In this way, the first and second plies do not need to be combined to form a subunit—the bottom ply embossments nesting into a structure formed by the embossing pattern of the first ply. Rather than being nested, that is one embossing pattern at least partially surrounding another, the embossing patterns are unregistered. This simplifies the manufacturing process as there is no need to operate the first and second embossing rolls in registration or synchronized with one another.

The embossed first and second tissue webs are joined together by a marrying roll 152 that runs against the first embossing roll 111. In this manner the embossed first tissue web, which may have an adhesive applied to its surface by an applicator roll 147, is laminated to the second embossed tissue web in a third nip 124 formed between the first embossing roll 111 and the marrying roll 152.

The resulting multi-ply tissue product 200 comprises an uppermost ply 203 and a bottommost ply 202. The first upper ply 203 has a plurality of embossments 205 that protrude inward towards the bottommost ply 202. In certain instances, such as illustrated in FIG. 8, the uppermost ply 203 may be attached to the bottommost ply 202 by an adhesive 210 disposed therebetween.

Generally, at least a portion of the uppermost ply embossments are arranged to form an open pattern, as discussed above. The bottommost ply 202 also comprises a plurality of embossments 206, a portion of which are preferably micro-embossments. While both the uppermost and bottommost plies comprise embossments, particularly embossments arranged in a pattern, the embossments are not arranged such that the patterns are registered with one another.

Further, in certain embodiments, it may be preferred to provide the uppermost ply with a plurality of continuous, curvilinear line elements formed from embossments having a depth of about 300 μm or more, such as about 325 μm or more, such as about 350 μm or more, such as from about 300 μm to about 500 μm. Conversely, the bottommost ply, is provided with a plurality of micro-embossments, which in certain preferred instances are dot embossments disposed at a density of at least 25 embossments/$cm^2$. Generally, the micro-embossments are disposed on the bottommost ply in a pattern, however, the pattern does not necessarily register with the pattern of embossments disposed on the uppermost ply. Despite the lack of registration between the embossing patterns, the resulting tissue products have improved properties, such as improved sheet bulk and softness.

Test Methods

Microscopy

Tissue products produced according to the present invention may be analyzed by microscopy as described herein. Particularly, the three-dimensional surface topography and embossments may be analyzed by generating and analyzing product 3-D surface maps and cross-sections, such as those illustrated in FIGS. 5A-5C. The images are taken using a VHX-1000 Digital Microscope manufactured by Keyence Corporation of Osaka, Japan. The microscope is equipped with VHX-5000 Communication Software Ver 1.5.1.1. The lens is an ultra-small, high performance zoom lens, VH-Z20R/Z20T.

The tissue product sample to be analyzed should be an undamaged, flat, and include representative embossments. A normal sheet of bath tissue, approximately 4 inches×4 inches in size, works well.

A three-dimensional image of the sample is obtained as follows:

1. Turn the digital microscope on and follow standard procedures for XY stage Initialization [Auto].
2. Turn the microscope magnification to ×100.
3. Place the tissue product sample on the stage with the first embossments facing up toward the lens.

4. If the fabric does not lie flat, place weights as needed along the perimeter to make fabric lie flat against the stage surface.
5. Use the focus adjustment to bring the fabric into sharp focus.
6. Select "Stitching" in the main menu. Select "3D stitching."
7. Set the stitching method by selecting "Stitch around the current position."
8. Select the Z set to set the upper and lower composition range. The upper limit should be set by going higher than the highest focal point that is clear. The lower limit should be set by going lower than the lowest focal point that is clear. After setting the upper and lower range, click OK.
9. Select "Start stitching" to begin accusation of the image.
10. In the 3D menu, select "Height/Color view" to identify dome-like features with the highest degree of topography.
11. In the 3D menu, select "Profile."
12. With the "Profile line" tab selected obtain a cross-section of the tissue sample identified in Step 10, select "Line" and using the cursor to draw a line across the identified portion of the sample. The line should bisect at least three adjacent first embossments. The peaks on the right and left side of the first embossments should be relatively planar (difference in height less than 10 percent). If the height difference between the peaks is more than 10 percent select another first embossment to measure.

To measure various embossment parameters, such as minimum and maximum heights and the distanced there between:

1. Select "Assist Tools."
2. Select "Max" tool to identify the maximum point to the left of the first embossment, such as maximum point 83 to the left of the first embossment 80 of FIG. 5C.
3. Select "Max" tool to identify the maximum point to the right of the first embossment, such as point 85 to the right of the first embossment 80 of FIG. 5C.
4. Select "Min" tool to identify the minimum point in the first embossment, such as point 81 of the first embossment 80 of FIG. 5C.

Basis Weight

Prior to testing, all samples are conditioned under TAPPI conditions (23±1° C. and 50±2 percent relative humidity) for a minimum of 4 hours. Basis weight of sample is measured by selecting twelve (12) products (also referred to as sheets) of the sample and making two (2) stacks of six (6) sheets. In the event the sample consists of perforated sheets of bath or towel tissue, the perforations must be aligned on the same side when stacking the usable units. A precision cutter is used to cut each stack into exactly 10.16×10.16 cm (4.0×4.0 inch) squares. The two stacks of cut squares are combined to make a basis weight pad of twelve (12) squares thick. The basis weight pad is then weighed on a top loading balance with a minimum resolution of 0.01 grams. The top loading balance must be protected from air drafts and other disturbances using a draft shield. Weights are recorded when the readings on the top loading balance become constant. The mass of the sample (grams) per unit area (square meters) is calculated and reported as the basis weight, having units of grams per square meter (gsm).

Caliper

Caliper is measured in accordance with TAPPI Test Method T 580 μm-12 "Thickness (caliper) of towel, tissue, napkin and facial products." The micrometer used for carrying out caliper measurements is an Emveco 200-A Tissue Caliper Tester (Emveco, Inc., Newberg, OR). The micrometer has a load of 2 kilo-Pascals, a pressure foot area of 2,500 square millimeters, a pressure foot diameter of 56.42 millimeters, a dwell time of 3 seconds and a lowering rate of 0.8 millimeters per second.

Tensile

Tensile testing is conducted on a tensile testing machine maintaining a constant rate of elongation and the width of each specimen tested is 3 inches. Testing is conducted under TAPPI conditions. More specifically, samples for dry tensile strength testing were prepared by conditioning under TAPPI conditions for at least 4 hours and then cutting a 3±0.05 inch (76.2±1.3 mm) wide strip in either the machine direction (MD) or cross-machine direction (CD) orientation using a JDC Precision Sample Cutter (Thwing-Albert Instrument Company, Philadelphia, PA, Model No. JDC 3-10, Serial No. 37333) or equivalent. The instrument used for measuring tensile strengths was an MTS Systems Sintech 11S, Serial No. 6233. The data acquisition software was MTS TestWorks® for Windows Ver. 3.10 (MTS Systems Corp., Research Triangle Park, NC). The load cell was selected from either a 50 Newton or 100 Newton maximum, depending on the strength of the sample being tested, such that the majority of peak load values fall between 10 to 90 percent of the load cell's full-scale value. The gauge length between jaws was 4±0.04 inches (101.6±1 mm) for facial tissue and towels and 2±0.02 inches (50.8±0.5 mm) for bath tissue. The crosshead speed was 10±0.4 inches/min (254±1 mm/min), and the break sensitivity was set at 65 percent. The sample was placed in the jaws of the instrument, centered both vertically and horizontally. The test was then started and ended when the specimen broke. The peak load was recorded as either the "MD tensile strength" or the "CD tensile strength" of the specimen depending on direction of the sample being tested. Ten representative specimens were tested for each product or sheet and the arithmetic average of all individual specimen tests was recorded as the appropriate MD or CD tensile strength having units of grams per three inches (g/3"). Tensile energy absorbed (TEA) and slope are also calculated by the tensile tester. TEA is reported in units of $g \cdot cm/cm^2$ and slope is recorded in units of kilograms (kg). Both TEA and Slope are directionally dependent and thus MD and CD directions are measured independently.

All products were tested in their product forms without separating into individual plies. For example, a 2-ply product was tested as two plies and recorded as such. In the tensile properties of basesheets were measured, the number of plies used varied depending on the intended end use. For example, if the basesheet was intended to be used for 2-ply product, two plies of basesheet were combined and tested.

Embodiments

In a first embodiment the present invention provides a multi-ply tissue product comprising a first ply comprising a plurality of first embossments disposed thereon in a first open pattern and a second ply having a plurality of micro-embossments disposed thereon in a second pattern, wherein the first and second patterns are not registered with one another when the first and second plies are arranged in facing relation with one another.

In a second embodiment the present invention provides the product of the first embodiment wherein the density of micro-embossments disposed one the second ply is at least 25 embossments/cm$^2$.

In a third embodiment the present invention provides the product of the first or the second embodiments wherein the tissue product consists of two plies and has a basis weight from about 35 to about 65 grams per square meter (gsm).

In a fourth embodiment the present invention provides the product of any one of the foregoing embodiments wherein the first and second plies have a basis weight from about 10 to about 25 gsm.

In a fifth embodiment the present invention provides the product of any one of the foregoing embodiments wherein the tissue product has a sheet bulk from about 6.0 to about 14.0 cubic centimeters per gram (cc/g).

In a sixth embodiment the present invention provides the product of any one of the foregoing embodiments wherein the tissue product is spirally wound around a core to yield a rolled tissue product.

In a seventh embodiment the present invention provides the product of any one of the foregoing embodiments wherein the tissue product has a basis weight of about 65 gsm or less and a GMT less than about 1,700 g/3".

In an eighth embodiment the present invention provides the product of any one of the foregoing embodiments wherein the first pattern is at least partially formed by dot embossments having a depth from about 300 to about 500 μm.

In a ninth embodiment the present invention provides the product of any one of the foregoing embodiments wherein the first pattern is at least partially formed by dot embossments arranged to form an open, continuous and curvilinear line element.

In a tenth embodiment the present invention provides the product of any one of the foregoing embodiments wherein the first pattern is at least partially formed by an open, continuous, curvilinear and substantially cross-machine direction (CD) oriented line element.

In an eleventh embodiment the present invention provides the product of any one of the foregoing embodiments wherein the first pattern has an embossed area ranging from about 3 to about 10 percent of the total surface area of the first tissue ply.

In a twelfth embodiment the present invention provides the product of any one of the foregoing embodiments wherein the first ply does not have embossments disposed in a closed pattern.

In a thirteenth embodiment the present invention provides the product of any one of the foregoing embodiments wherein the first pattern consists of a plurality of open, continuous, curvilinear and substantially cross-machine direction (CD) oriented line elements.

In a fourteenth embodiment the present invention provides the product of any one of the foregoing embodiments wherein the first pattern consists of a plurality of open, continuous, curvilinear and substantially cross-machine direction (CD) oriented line elements spaced apart from one another in the machine direction (MD) wherein the spacing between adjacent line elements varies along the length of the line element.

In a fifteenth embodiment the present invention provides the product of any one of the foregoing embodiments wherein the first pattern comprises a plurality of open, continuous, curvilinear and substantially cross-machine direction (CD) oriented line elements spaced apart from one another in the machine direction (MD) wherein the spacing between adjacent line elements varies from about 0.3 mm to about 6.0 mm along the length of the line element.

What is claimed is:

1. A multi-ply tissue product comprising a first tissue ply and a second tissue ply arranged in facing relation with one another, the first tissue ply having an outer surface and a plurality of first embossments disposed thereon in a first open embossing pattern consisting of a plurality of dot embossments arranged to form a plurality of continuous, substantially CD-oriented, wave-like line elements the second tissue ply having an outer surface and a plurality of second micro dot embossments disposed thereon at a density of at least about 25 embossments per square centimeter of ply surface area (embossments/cm$^2$) in a second embossing pattern covering from 6 to 15 percent of the second ply outer surface, wherein the first and second embossing patterns are not in registration with one another when the plies are brought into facing arrangement with one another and wherein the tissue product has a basis weight from about 35 to about 65 grams per square meter (gsm).

2. The multi-ply tissue product of claim 1 wherein the tissue product has a sheet bulk of about 6.0 cc/g or greater.

3. The multi-ply tissue product of claim 1 wherein the tissue product has a basis weight of about 60 gsm or less and a GMT of about 1,700 g/3" or less.

4. The multi-ply tissue product of claim 1 wherein the first embossments comprise dot embossments having a depth from about 300 to about 500 μm.

5. The multi-ply tissue product of claim 1 wherein the substantially CD-oriented, wave-like line elements are spaced apart from one another in the machine direction (MD).

6. The multi-ply tissue product of claim 5 wherein the spacing of adjacent CD-oriented is variable and ranges from about from about 0.3 mm to about 6.0 mm.

7. A multi-ply tissue product comprising:

a) a first ply having an outer surface and a first embossing pattern disposed thereon, the first embossing pattern consisting of a plurality of dot embossments arranged to form a plurality of continuous, substantially CD-oriented, wave-like line elements, each of the plurality of CD-oriented, wave-like line elements spaced apart from one another in the MD; and b) a second ply having an outer surface and a second embossing pattern disposed thereon, the second embossing pattern comprising a plurality of micro-embossments having a density of at least about 50 embossments/cm$^2$ and covering at least about 6 percent of the second ply outer surface, wherein the first and second embossing patterns are not in registration with one another when the plies are brought into facing arrangement with one another.

8. The multi-ply tissue product of claim 7 wherein the spacing of adjacent CD-oriented, wave-like line elements in the MD is variable.

9. The multi-ply tissue product of claim 8 wherein the spacing of adjacent CD-oriented, wave-like line elements ranges from about from about 0.3 mm to about 6.0 mm.

10. The multi-ply tissue product of claim 7 wherein the tissue product has a sheet bulk of about 6.0 cc/g or greater, a basis weight of about 60 gsm or less and a GMT of about 1,700 g/3" or less.

11. The multi-ply tissue product of claim 7 wherein the dot embossments have a depth from about 300 to about 500 μm.

12. A method of producing a tissue product comprising the steps of:

a) providing a first embossing station with a first embossing roll having a first embossing pattern comprising a plurality of dot protuberances disposed in a first open embossing pattern consisting of a plurality of substantially CD-oriented wave-like line elements and a first counter roll, the first embossing roll and first counter roll defining a first nip there between;

b) providing a second embossing station with a second embossing roll comprising a plurality of protuberances having a height from about 0.8 to about 1.2 mm and disposed in a second embossing pattern having a density of at least about 50 protuberances/$cm^2$ and covering from 6 to 15 percent of the embossing roll surface and a second counter roll, the second embossing roll and second counter roll defining a second nip there between;

c) directing a first tissue ply into the first nip to emboss the first tissue ply with the first open embossing pattern;

d) directing a second tissue ply into the second nip to emboss the second tissue ply with the second embossing pattern; and e) joining the first and second tissue plies together in facing arrangement to one another to form a multi-ply tissue product, wherein the first and second embossing patterns are not in registration with one another.

13. The method of claim 12 further comprising the steps of:

a) applying an adhesive to the surface of the first ply; and b) adhesively attaching the first and second plies.

14. The method of claim 12 further comprising the steps of:

a) providing a third counter roll in opposition to the first embossing roll to create a third nip; and b) directing the first and second plies through the third nip to join the plies together.

* * * * *